US011519129B2

United States Patent
Masters et al.

(10) Patent No.: US 11,519,129 B2
(45) Date of Patent: Dec. 6, 2022

(54) SEPARATION OF LINT FROM AN EXHAUST AIRSTREAM WITHIN A LAUNDRY APPLIANCE

(71) Applicant: WHIRLPOOL CORPORATION, Benton Harbor, MI (US)

(72) Inventors: Roy E. Masters, St. Joseph, MI (US); Brian K. Rogers, Watervliet, MI (US); Robert J. Pinkowski, Baroda, MI (US); Erica L. Roberts, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 450 days.

(21) Appl. No.: 16/597,285

(22) Filed: Oct. 9, 2019

(65) Prior Publication Data
US 2020/0208336 A1 Jul. 2, 2020

Related U.S. Application Data

(60) Provisional application No. 62/785,876, filed on Dec. 28, 2018.

(51) Int. Cl.
*D06F 58/22* (2006.01)
*B01D 45/14* (2006.01)
*B01D 46/00* (2022.01)
*B01D 46/10* (2006.01)
*B01D 46/48* (2006.01)
*D06F 58/04* (2006.01)
*B01D 46/681* (2022.01)
*B01D 50/20* (2022.01)

(52) U.S. Cl.
CPC ............. *D06F 58/22* (2013.01); *B01D 45/14* (2013.01); *B01D 46/0056* (2013.01); *B01D 46/10* (2013.01); *B01D 46/48* (2013.01); *B01D 46/681* (2022.01); *B01D 50/20* (2022.01); *D06F 58/04* (2013.01)

(58) Field of Classification Search
CPC ..... D06F 58/22; B01D 45/14; B01D 46/0056; B01D 46/10; B01D 46/48; B01D 46/681; B01D 50/20
USPC ............................................................ 34/82
See application file for complete search history.

(56) References Cited

U.S. PATENT DOCUMENTS 4,314,409 A * 2/1982 Cartier .................... D06F 58/22
34/82
6,016,610 A * 1/2000 Sears ...................... D06F 58/22
34/82

(Continued)

FOREIGN PATENT DOCUMENTS

DE 102010008151 8/2011
EP 1098028 5/2001

(Continued)

*Primary Examiner* — John P McCormack
(74) *Attorney, Agent, or Firm* — Price Heneveld LLP

(57) ABSTRACT

A laundry appliance includes a drum for processing laundry. A blower delivers process air through an airflow path that includes the drum. A lint filter is positioned within the airflow path that separates particulate matter from the process air to define entrapped lint particles. A lint disposal mechanism removes the entrapped lint particles from a surface of the lint filter to define removed lint. A holding compartment receives the removed lint for disposal.

19 Claims, 7 Drawing Sheets

(56) References Cited

U.S. PATENT DOCUMENTS

| | | | |
|---|---|---|---|
| 6,517,612 B1* | 2/2003 | Crouch | B01D 33/067 |
| | | | 95/277 |
| 8,667,705 B2* | 3/2014 | Shin | D06F 58/22 |
| | | | 68/18 R |
| 9,139,950 B2 | 9/2015 | Barrett et al. | |
| 9,217,220 B2 | 12/2015 | Ahn et al. | |
| 9,316,440 B2 | 4/2016 | Kim et al. | |
| 9,580,859 B2 | 2/2017 | Bommels et al. | |
| 10,077,528 B2 | 9/2018 | Yoichi et al. | |
| 2009/0158933 A1* | 6/2009 | Schaub | D06F 58/22 |
| | | | 95/282 |
| 2010/0146804 A1* | 6/2010 | Ahn | D06F 58/22 |
| | | | 34/82 |
| 2011/0154587 A1 | 6/2011 | Kim | |
| 2011/0271543 A1 | 11/2011 | Kim et al. | |
| 2018/0135233 A1 | 5/2018 | Lv et al. | |
| 2018/0230639 A1* | 8/2018 | Kim | D06F 58/22 |
| 2019/0345662 A1* | 11/2019 | Hato | D06F 58/22 |

FOREIGN PATENT DOCUMENTS

| | | |
|---|---|---|
| EP | 2202350 | 3/2017 |
| JP | S5694694 | 7/1981 |
| KR | 20110123361 | 11/2011 |

* cited by examiner

SEPARATION OF LINT FROM AN EXHAUST AIRSTREAM WITHIN A LAUNDRY APPLIANCE

CROSS-REFERENCE TO RELATED APPLICATION

This application claims priority to and the benefit under 35 U.S.C. § 119(e) of U.S. Provisional Patent Application No. 62/785,876, filed on Dec. 28, 2018, entitled SEPARATION OF LINT FROM AN EXHAUST AIRSTREAM WITHIN A LAUNDRY APPLIANCE, the entire disclosure of which is hereby incorporated herein by reference.

FIELD OF THE DEVICE

The device is in the field of laundry appliances, and more specifically, laundry appliances having a lint removal system that requires a minimal amount of intervention for removing lint from a laundry appliance.

SUMMARY

According to one aspect of the present disclosure, a laundry appliance includes a drum for processing laundry. A blower delivers process air through an airflow path that includes the drum. A lint filter is positioned within the airflow path that separates particulate matter from the process air to define entrapped lint particles. A lint disposal mechanism removes the entrapped lint particles from a surface of the lint filter to define removed lint. A holding compartment receives the removed lint for disposal.

According to another aspect of the present disclosure, a laundry appliance includes a drum for processing laundry. A blower delivers process air through an airflow path that includes the drum. A lint filter is positioned within the airflow path that separates particulate matter from the process air to define entrapped lint particles. A holding compartment receives the entrapped lint particles as removed lint via a lint disposal mechanism.

According to yet another aspect of the present disclosure, a laundry appliance includes a drum for processing laundry. A blower delivers process air through an airflow path that includes the drum. A cyclonic lint filter is positioned within the airflow path that separates particulate matter from the process air to define entrapped lint particles. A holding compartment receives the entrapped lint particles as removed lint via a lint disposal mechanism.

These and other features, advantages, and objects of the present device will be further understood and appreciated by those skilled in the art upon studying the following specification, claims, and appended drawings.

DETAILED DESCRIPTION OF EMBODIMENTS

Figure 1:
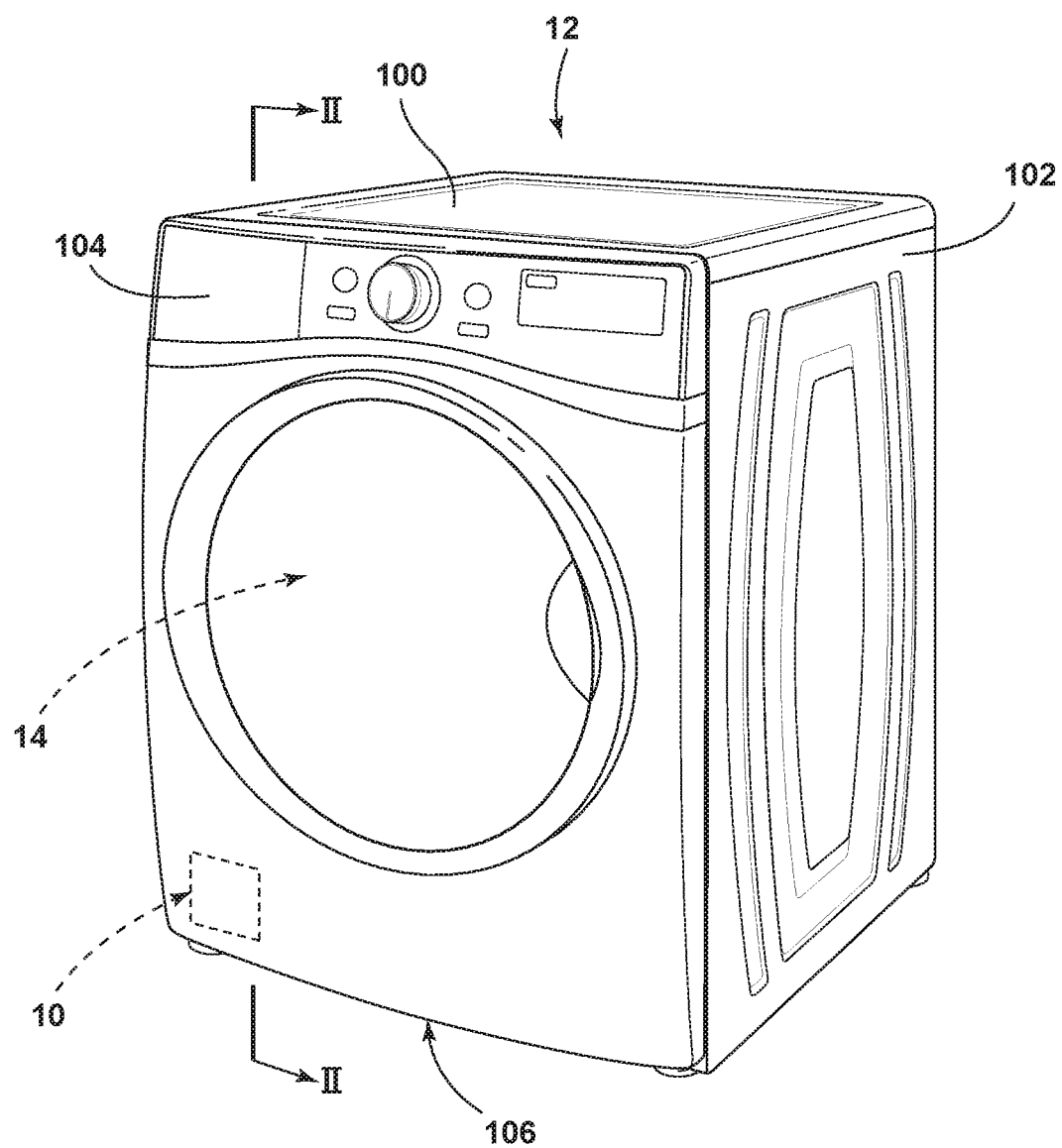
FIG. 1 is a front elevational view of a laundry appliance incorporating an aspect of the maintenance free lint removal system.
Figure 2:
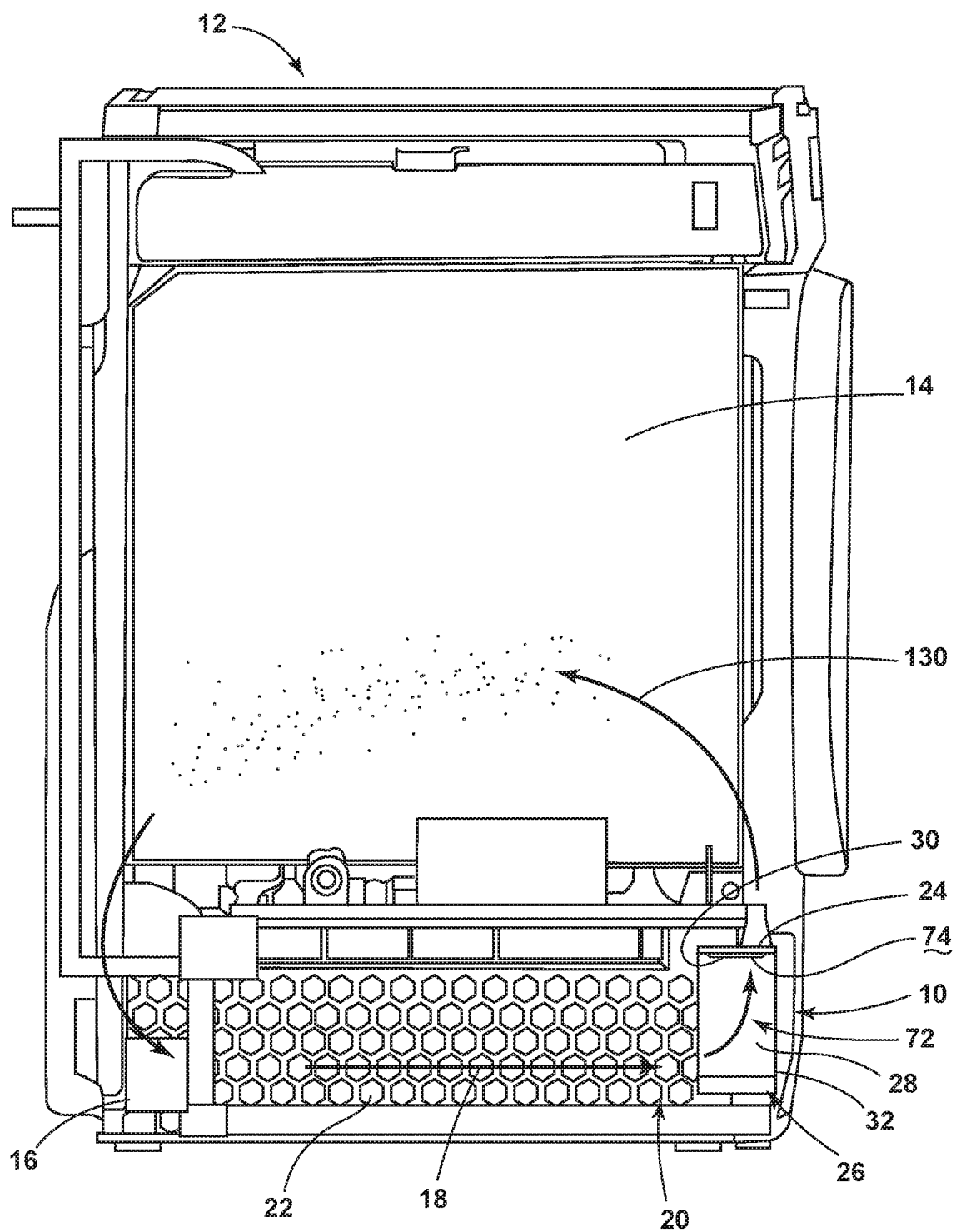
FIG. 2 is a cross-sectional view of the laundry appliance of FIG. 1, taken along line II-II.
Figure 3:
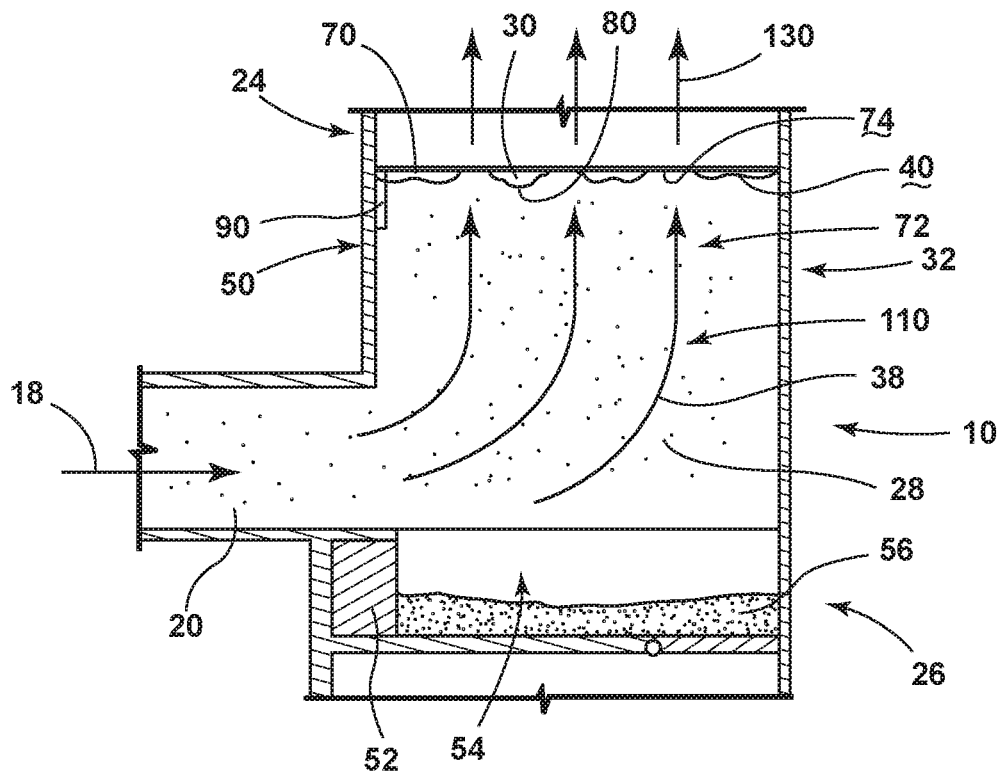
FIG. 3 is a schematic cross-sectional view of a horizontally positioned lint filter for capturing lint particles as the air moves in a generally vertical direction.
Figure 4:
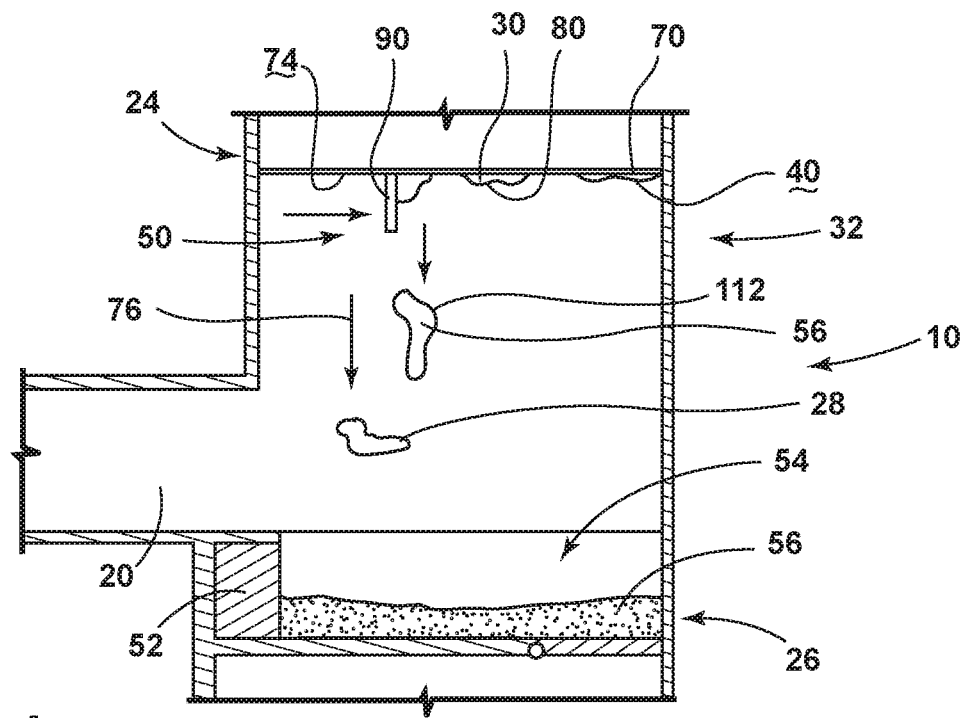
FIG. 4 is a schematic cross-sectional view of the lint filter of FIG. 3 and showing accumulation of lint particles within a compacting mechanism.
Figure 5:
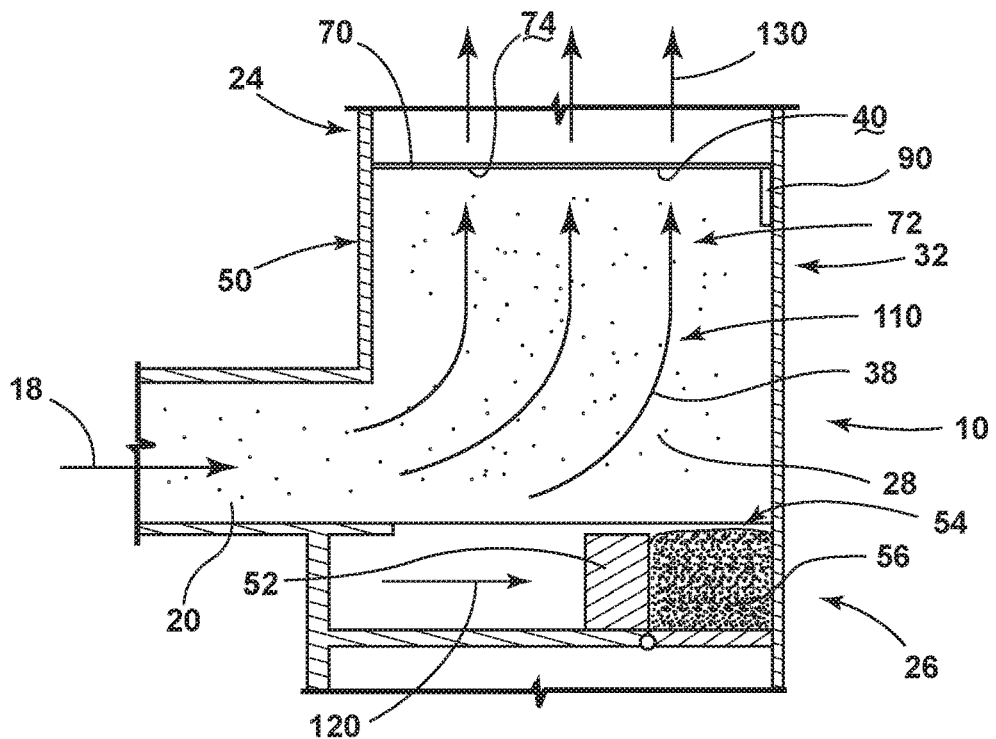
FIG. 5 is a schematic cross-sectional view of the lint filter of FIG. 4 and showing compaction of the lint particles into a lint pellet.
Figure 6:
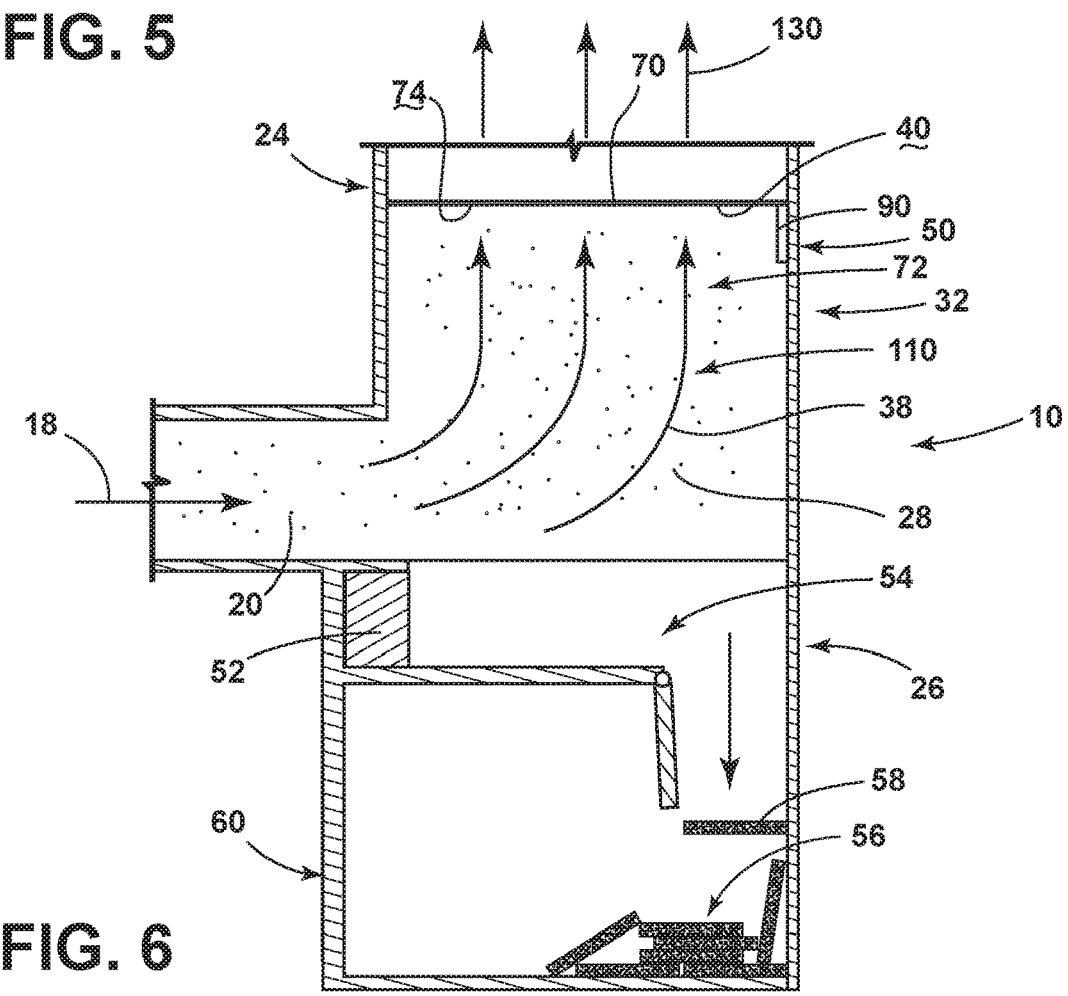
FIG. 6 is a cross-sectional view of the lint filter of FIG. 5 and showing a pellet collection space positioned near the lint filter.
Figure 7:
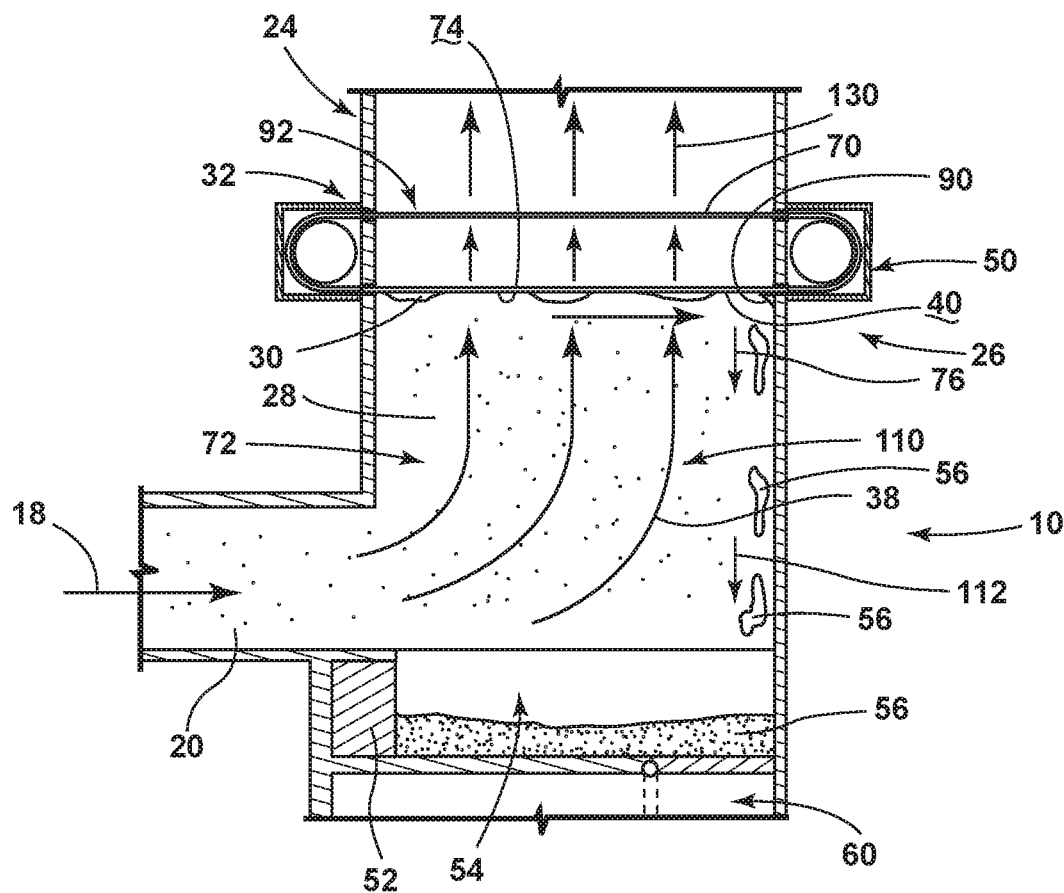
FIG. 7 is a schematic cross-sectional view of an aspect of the horizontally positioned lint filter that includes an operable screen.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-9, reference numeral 10 generally refers to a lint removal system that is incorporated within a laundry appliance 12, typically a drying appliance 12. The laundry appliance 12 can include various mechanisms for washing, drying, or otherwise processing laundry. Typically, the laundry appliance 12 includes the rotating drum 14 for processing laundry. A blower 16 is disposed within the laundry appliance 12 and delivers process air 18 through an airflow path 20 of the laundry appliance 12. The blower 16 can be a fan, an air handling unit, or other air moving device that can move process air 18 through the drum 14 using positive pressure or negative pressure via an induced flow of process air 18 through the drum 14. The airflow path 20 can include the rotating drum 14 and can also include various air conditioning mechanisms 22. These air conditioning mechanisms 22 can include one or more heat exchangers, electrical heaters, and other similar mechanisms that serve to heat and, in certain appliances, cool the process air 18 within the laundry appliance 12. A lint filter 24 of the lint removal system 10 is positioned within the airflow path 20. The lint filter 24 is part of a lint disposal mechanism 26 to separate particulate material, such as lint particles, from the process air 18. The lint disposal mechanism 26 is included within the lint removal system 10 to separate and dispose of entrapped lint 30 from a surface 40 of the lint filter 24.

According to various aspects of the device, the lint removal system 10 can also be operated without a conventional filter. In such an embodiment, the lint disposal mechanism 26 operates to eliminate lint from an area where particles of entrapped lint 30 are stored for disposal. As exemplified herein, various aspects of the lint filter 24 can include a horizontally positioned filter screen that is positioned within a filter housing 32. The lint filter 24 can also include a cyclonic separator 34 that utilizes one or more cyclonic flows 36 of air 38 for separating the particulate material from the process air 18.

In various aspects of the lint disposal mechanism 26, the lint filter 24 may be cleaned after each drying cycle, or intermittently within each drying cycle, depending upon the build-up of lint particles on the surface 40 of the lint filter 24. In various aspects of the device, the lint disposal mechanism 26 is configured to operate continuously or substantially continuously throughout a particular drying cycle of the appliance 12. Through continuous operation, a surface 40 of the lint filter 24 is allowed to remain substantially unobstructed by entrapped lint 30.

Within various aspects of the device, particulate material that becomes entrapped within the lint filter 24 can be removed by the lint disposal mechanism 26. Portions of the lint filter 24 are periodically cleaned or continuously cleaned so that the process air 18 can move relatively freely through the lint filter 24 and through the drying cycle.

Referring now to FIGS. 3-6, the lint disposal mechanism 26 can include a lint removal apparatus 50. This lint removal apparatus 50 can include a selectively operable portion that is configured to remove particles of entrapped lint 30 from the surface 40 of the lint filter 24 to a separate area. This separate area can typically be in the form of a compactor 52 that operates within a compacting chamber 54. In such an embodiment, the compactor 52 can operate to compact the removed lint 56 that is disposed within the compacting chamber 54 into a compressed lint pellet 58 that can be disposed within a removable or emptyable holding compartment 60.

As exemplified in FIGS. 3-7, the lint filter 24 within the filter housing 32 is a horizontally positioned lint screen 70. In this horizontal configuration, the lint screen 70 receives process air 18 from below such that the process air 18 moves in a vertical direction 72 through the lint filter 24. Particulate material 28 entrapped within the process air 18 is captured by the lint screen 70. This particulate material 28 accumulates on a bottom surface 74 of the lint screen 70. During operation of the laundry appliance 12, the particulate material 28 can engage the bottom surface 74 of the lint screen 70 and take the form of entrapped lint 30 on the bottom surface 74 thereof. The lint removal apparatus 50 can be utilized to remove this entrapped lint 30 from the bottom surface 74. Because the entrapped lint 30 is contained on a bottom surface 74 of the lint filter 24, the lint removal apparatus 50 can also utilize the force of gravity 76 for allowing lint particles to fall from the bottom surface 74 of the lint filter 24 and into the separate chamber, such as a compacting chamber 54.

The lint removal apparatus 50 can take the form of any one of various mechanisms. Such mechanisms can include, but are not limited to, lint scrapers 90, a rotating lint screen 92 (show in FIG. 7) and other rotationally operable mechanisms, concentrated streams of air 38, fluid streams, combinations thereof, and other similar lint removal configurations. Where the rotating lint screen 92 is used, the lint scraper 90 is typically substantially fixed relative to the airflow path 20.

Referring again to FIGS. 3-7, because the particles of entrapped lint 30 are entrapped within a bottom surface 74 of the lint screen 70, only a minimal amount of force may be effective to dislodge the entrapped lint 30 from the bottom surface 74 of the lint filter 24. After being dislodged, the entrapped lint 30 may fall away under the force of gravity 76, as removed lint 56, and into the compacting chamber 54 or other lint processing apparatus. According to various aspects of the device, the selectively operable portion of the lint removal apparatus 50 is a lint scraper 90 having a minimal amount of abrasiveness can be used to push or dislodge the entrapped lint 30 off from the bottom surface 74 of the lint filter 24. Using gravity 76, the lint scraper 90 can engage the bottom surface 74 of the lint filter 24 through a substantially minimal engagement. The substantially minimal engagement allows the lint removal apparatus 50 to push the entrapped lint 30 off from a bottom surface 74 of the lint filter 24. The lint scraper 90 may also engage a bottom portion 80 of the entrapped lint 30. Because the entrapped lint 30 tends to adhere as clumps, the entire section of entrapped lint 30 may fall away with only minimal scraping or other engagement. Once pushed off from the surface 40 or pushed relative to the bottom surface 74 of the lint filter 24, entrapped lint 30 typically falls according to the force of gravity 76 and into the separate compacting chamber 54.

As exemplified in FIGS. 1-7, the airflow path 20 for the laundry appliance 12 moves through the filter housing 32 in a generally vertical direction 72. This filter housing 32 can be located within various portions of the laundry appliance 12. In various aspects of the device, the filter housing 32 can be positioned toward a top portion 100 of the cabinet 102 for the appliance 12. Accordingly, process air 18 leaving the drum 14 for the laundry appliance 12 can be delivered upward and toward the top portion 100 of the appliance 12, where the filter housing 32 is located. The process air 18 moves vertically through the lint screen 70 and the filter housing 32 so that the entrapped lint 30 can be captured on the bottom surface 74 of the lint screen 70. The compacting chamber 54 can be located below the filter housing 32 and may be accessible via a drawer 104 or other accessible compartment contained within a top portion 100 of the appliance 12.

It is also contemplated that the filter housing 32 can be located within a lower portion 106 of the appliance 12. In the various configurations, the airflow path 20 moves in a generally vertical direction 72 through the filter housing 32 and the lint filter 24. Additionally, the compacting chamber 54 is typically positioned below the lint filter 24 such that gravity 76 can be used to remove the entrapped lint 30 from the lint screen 70 and place the removed lint 56 into the compacting chamber 54.

According to various aspects of the device, the horizontally positioned lint screen 70 may include various sensors, and other devices for monitoring the amount of entrapped lint 30 that accumulates on the bottom surface 74 of the lint screen 70. Where a predetermined amount of entrapped lint 30 accumulates on the bottom surface 74 of the lint screen 70, the lint removal apparatus 50 can be activated to engage the bottom surface 74 of the lint screen 70 or the bottom portion 80 of the entrapped lint 30. The lint removal apparatus 50 operates to remove the entrapped lint 30 from the lint screen 70 and move the entrapped lint 30 to the compacting chamber 54. The lint removal apparatus 50 may activate during a drying cycle, or may be activated after the drying cycle is complete.

The amount of entrapped lint 30 within the bottom surface 74 of the lint filter 24 can be monitored through various mechanisms. Such mechanisms can include, but are not limited to, proximity sensors, visual sensors, infrared sensors, lasers, and other similar sensing mechanisms that can be used to directly monitor the amount of entrapped lint 30 on the bottom surface 74 of the lint filter 24. Other lint monitoring apparatuses can include devices used to monitor the effects of accumulations of entrapped lint 30. Such devices can include, but are not limited to, auditory sensors that can monitor the sound of air 38 moving through the airflow path 20 and motor sensors that can be used to measure the efficiency of the system. In certain aspects of the device, as entrapped lint 30 accumulates on the bottom surface 74 of the lint screen 70, the overall operation of the appliance 12 may become less efficient. These efficiencies can be monitored such that where a certain minimal efficiency is not achieved, the lint removal apparatus 50 can be activated to remove the accumulation of entrapped lint 30 from the bottom surface 74 of the lint screen 70.

As discussed above, during operation of the lint removal apparatus 50, gravity 76 allows the removed lint 56 to fall into the compacting chamber 54. Because gravity 76 is utilized, and also because the airflow path 20 moves in a generally vertical and upward direction 110 through the lint filter 24, the blower 16 may be intermittently stopped so that the lint removal apparatus 50 can be utilized and gravity 76 can be used to allow the particulate material 28 to fall in a downward direction 112 into the compacting chamber 54. Once the particulate material 28 is within the compacting chamber 54, the blower 16 may resume operation to dry the laundry within the rotating drum 14.

As exemplified in FIGS. 3-6, a compactor 52 can act upon the removed lint 56 within the compacting chamber 54. This compactor 52 can exert a compressive force 120 onto the removed lint 56. This compressive force 120 is typically sufficient enough to compact the particulate material 28 into the compressed lint pellet 58. The compressed lint pellet 58 is configured so that it does not experience any rebound or only very minimal amounts of rebound. Where rebound is experienced, the compressed lint pellet 58 may expand into a larger volumetric configuration. The compressed lint pellet 58, once fully compressed, can then be dropped or otherwise ejected via a door or other aperture into a holding compartment 60 disposed within the appliance 12. As discussed above, this holding compartment 60 may be an externally accessible compartment that can be accessed by the user for removing the various lint pellets 58 from the appliance 12.

The amount of compressive force 120 exerted by the compactor 52 can be a consistent compressive force 120 that can achieve the non-rebounding or substantially non-rebounding formation of the compressed lint pellets 58. This compressive force 120, based upon testing performed on various aspects of the lint disposal mechanism 26, has been shown to be from approximately 6.5 pounds per square inch to approximately 9.8 pounds per square inch using various components of particulate material. These compressive forces 120 can be used to achieve a density of compressed lint pellet 58 that is from approximately three grams per cubic centimeter to approximately nine grams per cubic centimeter. This range in density has been shown to achieve a non-rebounding or a substantially non-rebounding configuration of the compressed lint pellets 58.

According to various aspects of the device, the holding compartment 60 can be adapted to be a non-removable chamber that receives the formed compressed lint pellets 58 through the life of the appliance 12. Stated another way, the holding compartment 60 can be configured to not be emptied during the life of the appliance 12. It is also contemplated that the holding compartment 60 can be periodically removed or emptied by the user of the appliance 12. Periodic emptying or removal of the holding compartment 60 can also be performed by a service technician during various service calls for the appliance 12.

Figure 8:
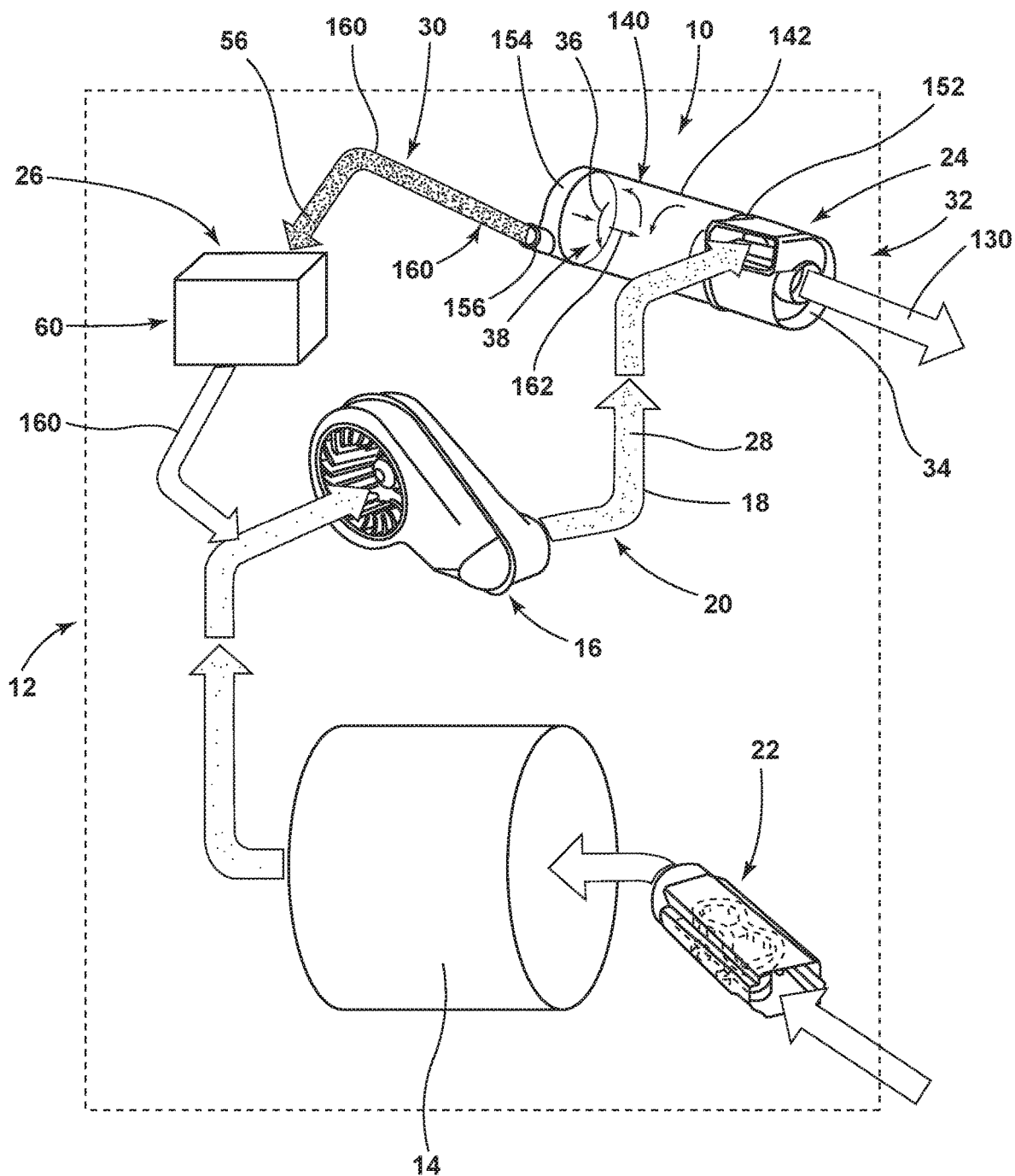
FIG. 8 is a schematic view of an airflow system for a laundry appliance including a cyclonic separator.
Figure 9:
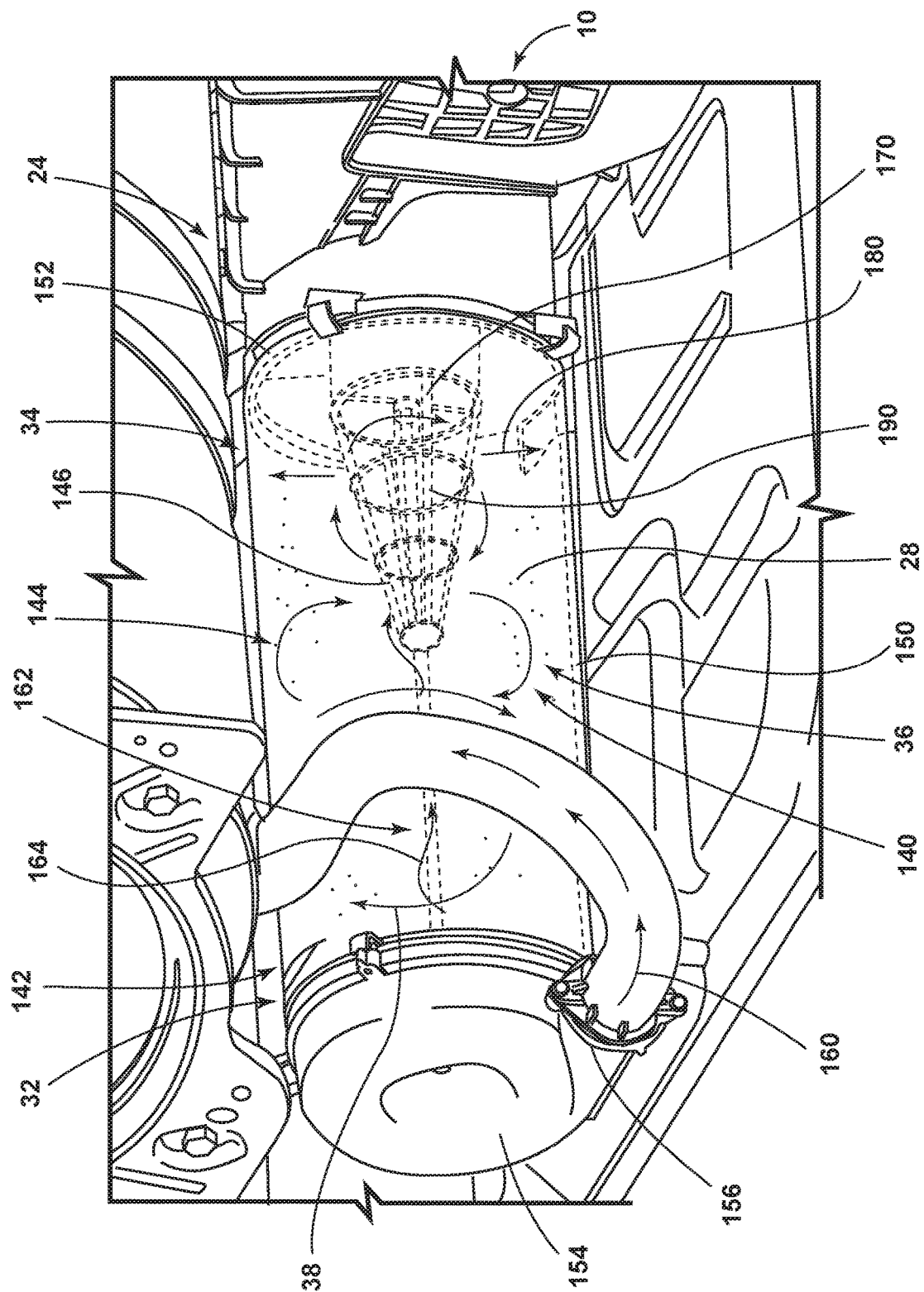
FIG. 9 is an enlarged perspective view of the cyclonic separator of FIG. 8.

Referring now to FIGS. 8 and 9, the lint filter 24 can take the form of a cyclonic lint filter, such as a cyclonic separator 34 that can be used to separate particulate material 28 from the process air 18 for disposal. Such disposal can be into a compacting chamber 54, or into a separate lint filter 24 for collecting entrapped lint 30 therein. In various aspects of the device, the lint filter 24 can be the horizontally oriented lint screen 70 described herein. Other forms of lint filters 24 can also be incorporated for capturing the entrapped lint 30 that is removed by the cyclonic separator 34. Using the cyclonic separator 34, cleaned process air 130 that is substantially free of particulate material 28 can then be moved back through the drum 14 of the appliance 12, or ejected from the appliance 12 in a case of a venting appliance 12.

Referring again to FIGS. 8 and 9, the cyclonic separator 34 can use a high-speed rotating or helical flow 140 of process air 18 that is established within a cyclonic container 142 that forms or at least partially forms the cyclonic effect 144. The cyclonic separator 34 can include a rotating filter 146 that operates about a rotational axis and that can receive the helical flow 140 of process air 18 for capturing portions of the particulate material 28 within the process air 18. According to various aspects of the device, during operation of the cyclonic separator 34, process air 18 moving through the cyclonic container 142 enters therein from a side 150 of the cylindrical cyclonic separator 34. This process air 18 forms a generally helical flow 140 that moves through the cyclonic separator 34. The helical flow 140 within the cyclonic separator 34 also causes a rotation of the conical rotating filter 146. The process air 18 moves in a helical flow 140 from a filter end 152 of the cyclonic container 142 and to the particle outlet end 154 of the cyclonic container 142. Through the movement of process air 18, the cyclonic flow 36 forms a substantially smooth movement of air 38 toward the particle outlet end 154 of the cyclonic container 42.

As air 38 is moved to the particle outlet end 154, the air 38 tends to slow down at the particle outlet end 154. A minimal amount or minimal flow 160 of this air 38 is allowed to eject through a particle outlet 156. This slowed minimal flow 160 of air 38 tends to capture and retain a majority of the particulate material that was contained within the process air 18 in the cyclonic container 142. This minimal flow 160 of process air 18 includes only a portion of the cyclonic flow 36 that moves through the cyclonic container 142. The process air 18 reaching the particle outlet end 154 of the cyclonic container 142 typically moves in two paths from the particle outlet end 154. One path, as described above, includes the minimal flow 160 of the process air 18 that moves through the particle outlet 156 and toward a separate filtering or particle capturing area. The remainder of the process air 18 moves in a substantially turbulent flow 162 through a center 164 of the cyclonic separator 34 and towards the conical rotating filter 146. Because of the turbulent nature of this turbulent flow 162, particulate material 28 tends to not be entrapped therein and tends to fall away for collection in the particle outlet end 154. The turbulent flow 162 of air 38 through a center 164 of the cyclonic container 142 moves toward the conical rotating filter 146. Remnants of particulate material 28 that may be entrapped within the turbulent flow 162 of air 38 can be captured within the conical rotating filter 146.

As described above, the cyclonic flow 36 of air 38 causes a rotational operation 170 of the conical rotating filter 146. This rotational operation 170 of the conical rotating filter 146 can tend to throw entrapped lint 30 in a generally outward direction 180 through a centrifugal force and back into the helical flow 140 of process air 18. To achieve a desired rotational speed of the conical rotating filter 146, the conical rotating filter 146 can include at least one and typically a plurality of fins 190 or outwardly extending bodies that can capture portions of the helical flow 140 to produce the desired rotational operation 170 of the conical rotating filter 146. The helical flow 140 of process air 18, in connection with the conical rotating filter 146, can cause most, if not all, of the particulate material 28 contained within the cyclonic container 142 to be thrown generally outward and moved toward the particle outlet end 154 of the cyclonic container 142.

The conical rotating filter 146 contained within the cyclonic separator 34 can be rotationally operable through the use of bearings, sliding mechanisms, or other similar mechanisms that produce a reproducible rotational operation 170 of the conical rotating filter 146 during operation of the helical flow 140 of process air 18 within the cyclonic container 142. It is also contemplated that the conical rotating filter 146 can be operated through the use of a motor to produce the desired rotational operation 170 of the conical rotating filter 146.

Through the use of the cyclonic container 142, the majority of the process air 18 moving through the cyclonic container 142 is directed through the conical rotating filter 146 and through the airflow path 20 to be returned to the drum 14. The minimal flow 160 of air 38 that entraps the majority of the particulate material 28 is moved toward a holding compartment 60 or an aspect of the compacting chamber 54 described herein. This minimal flow 160 of air 38 is then returned to the airflow path 20 for additional processing.

Referring again to FIG. 8, in various aspects of the device, the process air 18 that is moved back to the drum 14 for continuing a drying operation is moved through the conical rotating filter 146 of the cyclonic container 142. The minimal flow 160 of air 38 that moves the particles of entrapped lint 30 to the holding compartment 60 or compacting chamber 54 of the appliance 12 is then recycled back to a blower 16 so that it can be recycled through the cyclonic container 142 to remove additional particulate material 28 therefrom. Using the cyclonic container 142, particulate material 28 of a particular size or larger can be substantially removed from the process air 18 before being returned to the drum 14. Lint particles and other particulate material 28 that may be smaller than the mesh size of the conical rotating filter 146 may pass through the conical rotating filter 146 and return to the drum 14.

According to various aspects of the device, the lint disposal mechanisms 26 disclosed herein can be used within various appliances 12. Such appliances 12 can include, but are not limited to, vented dryers, conventional heating element dryers, heat pump dryers, exhaust dryers, combination washing/drying appliances, appliances that incorporate a heat pump system, condensing dryers, appliances that incorporate an air-to-air heat exchanger, refrigerating appliances, freezers, combinations thereof, and other similar appliances. It is also contemplated that various aspects of the lint disposal mechanism 26 can be included within the air handling systems, air conditioners, furnaces, air filtration devices, air sanitizers, combinations thereof, and other similar air handing systems.

According to another aspect of the present disclosure, a laundry appliance includes a drum for processing laundry. A blower delivers process air through an airflow path that includes the drum. A lint filter is positioned within the airflow path that separates particulate matter from the process air to define entrapped lint particles. A lint disposal mechanism removes the entrapped lint particles from a surface of the lint filter to define removed lint. A holding compartment receives the removed lint for disposal.

According to another aspect, the lint filter includes a generally horizontal filter screen that collects particulate material on a bottom surface of the filter screen.

According to yet another aspect, the lint filter includes a selectively operable portion that operates within the airflow path to remove the entrapped lint particles.

According to another aspect of the present disclosure, the removed lint falls by force of gravity to the holding compartment.

According to another aspect, the holding compartment includes a compactor that operates to compact the removed lint to define lint pellets.

According to yet another aspect, the selectively operable portion includes a lint scraper.

According to another aspect of the present disclosure, the lint filter operates relative to the lint scraper and the lint scraper is substantially fixed relative to the airflow path.

According to another aspect, the lint disposal mechanism includes a cyclonic separator that operates to separate the entrapped lint particles from the lint filter and direct the removed lint to the holding compartment.

According to yet another aspect, the cyclonic separator includes a rotating filter that receives a helical flow of the process air and that rotates the rotating filter.

According to another aspect of the present disclosure, a laundry appliance includes a drum for processing laundry. A blower delivers process air through an airflow path that includes the drum. A lint filter is positioned within the airflow path that separates particulate matter from the process air to define entrapped lint particles. A holding compartment receives the entrapped lint particles as removed lint via a lint disposal mechanism.

According to another aspect, the lint filter includes a rotationally operable mechanism that operates the lint filter within the airflow path.

According to yet another aspect, the lint filter is a rotating filter that is rotated about a rotational axis via a helical flow of the process air.

According to another aspect of the present disclosure, the rotationally operable lint filter is positioned at a filter end of a cyclonic separator. The helical flow of the process air directs the removed lint to a particle outlet end of the cyclonic separator that is opposite the filter end.

According to another aspect, rotation of the rotationally operable lint filter directs the entrapped lint particles outward via centrifugal force. A portion of the process air moves through the rotationally operable lint filter. A slowed flow of air directs the removed lint to the outlet end of the cyclonic separator.

According to yet another aspect, the rotationally operable lint filter is a conical rotating filter that rotates about the rotational axis.

According to another aspect of the present disclosure, the rotationally operable lint filter includes a plurality of fins that engage the helical flow of the process air.

According to another aspect, a laundry appliance includes a drum for processing laundry. A blower delivers process air through an airflow path that includes the drum. A cyclonic lint filter is positioned within the airflow path that separates particulate matter from the process air to define entrapped lint particles. A holding compartment receives the entrapped lint particles as removed lint via a lint disposal mechanism.

According to yet another aspect, the cyclonic lint filter includes a rotationally operable lint filter that is rotated about a rotational axis via a helical flow of the process air.

According to another aspect of the present disclosure, the rotationally operable lint filter is positioned at a filter end of the cyclonic lint filter. The helical flow of the process air directs the removed lint to an outlet end of the cyclonic lint filter that is opposite the filter end.

According to another aspect, rotation of the rotationally operable lint filter directs the entrapped lint particles outward via centrifugal force. A portion of the process air moves through the rotationally operable lint filter. A slower flow of air directs the removed lint to the outlet end of the cyclonic lint filter.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A laundry appliance comprising:
   a drum for processing laundry;
   a blower that delivers process air through an airflow path that includes the drum;
   a lint filter positioned within the airflow path that separates particulate matter from the process air to define entrapped lint particles;
   a lint disposal mechanism that removes the entrapped lint particles from a surface of the lint filter to define removed lint; and
   a holding compartment that receives the removed lint for disposal, wherein the holding compartment includes a compactor that operates within a compacting chamber to compact the removed lint to define lint pellets, wherein the compactor operates within the compacting chamber and in a linear direction toward a portion of the holding compartment to exert a compressive force that presses the removed lint into the lint pellets, wherein the holding compartment includes a removable collecting chamber that receives the lint pellets from the compactor, and wherein the removable collecting chamber is configured to receive a plurality of lint pellets from the compactor that accumulate within the removable collecting chamber.

2. The laundry appliance of claim 1, wherein the lint filter includes a generally horizontal filter screen that collects particulate material on a bottom surface of the generally horizontal filter screen.

3. The laundry appliance of claim 2, wherein the lint filter includes a selectively operable portion that operates within the airflow path to remove the entrapped lint particles.

4. The laundry appliance of claim 2, wherein the removed lint falls by force of gravity to the holding compartment.

5. The laundry appliance of claim 3, wherein the selectively operable portion includes a lint scraper.

6. The laundry appliance of claim 5, wherein the lint filter operates relative to the lint scraper and the lint scraper is substantially fixed relative to the airflow path.

7. The laundry appliance of claim 1, wherein the lint disposal mechanism includes a cyclonic separator that operates to separate the entrapped lint particles from the lint filter and direct the removed lint to the holding compartment.

8. The laundry appliance of claim 7, wherein the cyclonic separator includes a rotating filter that receives a helical flow of the process air and that rotates the rotating filter.

9. A laundry appliance comprising:
   a drum for processing laundry;
   a blower that delivers process air through an airflow path that includes the drum;
   a lint filter that is positioned within the airflow path that separates particulate matter from the process air to define entrapped lint particles; and
   a holding compartment that receives the entrapped lint particles as removed lint via a lint disposal mechanism, wherein the holding compartment includes a compactor that operates within a compacting chamber to compact the removed lint to define lint pellets, wherein the compactor operates within the compacting chamber and in a linear direction toward a portion of the holding compartment to exert a compressive force that presses the removed lint into the lint pellets, and wherein the holding compartment includes a removable collecting chamber that is positioned below the compactor and collects a plurality of the lint pellets from the compactor.

10. The laundry appliance of claim 9, wherein the lint filter includes a rotationally operable mechanism that operates the lint filter within the airflow path.

11. The laundry appliance of claim 10, wherein the lint filter is a rotating filter that is rotated about a rotational axis via a helical flow of the process air.

12. The laundry appliance of claim 10, wherein the rotationally operable mechanism is positioned at a filter end of a cyclonic separator, and wherein a helical flow of the process air directs the removed lint to a particle outlet end of the cyclonic separator that is opposite the filter end.

13. The laundry appliance of claim 12, wherein rotation of the rotationally operable mechanism directs the entrapped lint particles outward via centrifugal force, and wherein a portion of the process air moves through the rotationally operable mechanism, and wherein a slowed flow of air directs the removed lint to the particle outlet end of the cyclonic separator.

14. The laundry appliance of claim 10, wherein the rotationally operable mechanism is a conical rotating filter that rotates about a rotational axis.

15. The laundry appliance of claim 11, wherein the rotationally operable mechanism includes a plurality of fins that engage the helical flow of the process air.

16. A laundry appliance comprising:
a drum for processing laundry;
a blower that delivers process air through an airflow path that includes the drum;
a cyclonic lint filter that is positioned within the airflow path that separates particulate matter from the process air to define entrapped lint particles; and
a holding compartment that receives the entrapped lint particles as removed lint via a lint disposal mechanism, wherein the holding compartment includes a compactor that operates within a compacting chamber to compact the removed lint to define lint pellets, wherein the compactor operates within the compacting chamber and in a linear direction toward a portion of the holding compartment to exert a compressive force that presses the removed lint into the lint pellets, wherein the holding compartment includes a removable collecting chamber that receives the lint pellets from the compactor, and wherein the removable collecting chamber is configured to receive a plurality of lint pellets from the compactor that accumulate within the removable collecting chamber.

17. The laundry appliance of claim 16, wherein the cyclonic lint filter includes a rotationally operable lint filter that is rotated about a rotational axis via a helical flow of the process air.

18. The laundry appliance of claim 17, wherein the rotationally operable lint filter is positioned at a filter end of the cyclonic lint filter, and wherein the helical flow of the process air directs the removed lint to an outlet end of the cyclonic lint filter that is opposite the filter end.

19. The laundry appliance of claim 18, wherein rotation of the rotationally operable lint filter directs the entrapped lint particles outward via centrifugal force, and wherein a portion of the process air moves through the rotationally operable lint filter, and wherein a slower flow of air directs the removed lint to the outlet end of the cyclonic lint filter.

* * * * *